US012673780B2

(12) United States Patent
Mocan

(10) Patent No.: US 12,673,780 B2
(45) Date of Patent: Jul. 7, 2026

(54) EXHAUST AIRFLOW SYSTEM

(71) Applicant: Pipistrel d.o.o., Ajdovscina (SI)

(72) Inventor: Blaz Mocan, Ljubljana (SI)

(73) Assignee: Pipistrel d.o.o., Ajdovscina (SI)

( * ) Notice: Subject to any disclaimer, the term of this patent is extended or adjusted under 35 U.S.C. 154(b) by 4 days.

(21) Appl. No.: 18/665,530

(22) Filed: May 15, 2024

(65) Prior Publication Data

US 2024/0400214 A1 Dec. 5, 2024

Related U.S. Application Data

(60) Provisional application No. 63/506,358, filed on Jun. 5, 2023.

(51) Int. Cl.
*B64D 27/355* (2024.01)
*B64C 13/16* (2006.01)
*B64C 21/02* (2006.01)

(52) U.S. Cl.
CPC ............ *B64D 27/355* (2024.01); *B64C 13/16* (2013.01); *B64C 21/02* (2013.01)

(58) Field of Classification Search
CPC ...... B64D 27/355; B64D 21/04; B64D 21/08; B64D 33/04; B64D 2041/005
See application file for complete search history.

(56) References Cited

U.S. PATENT DOCUMENTS

| | | | |
|---|---|---|---|
| 9,193,436 B2 | 11/2015 | Bernhardt | |
| 11,876,263 B1 * | 1/2024 | Wang ................ | H01M 8/04014 |
| 2015/0210388 A1 | 7/2015 | Criado et al. | |
| 2022/0332219 A1 * | 10/2022 | Miftakhov ........ | H01M 8/04007 |
| 2022/0356848 A1 * | 11/2022 | Joshi ................ | H01M 8/04761 |

FOREIGN PATENT DOCUMENTS

| | | | |
|---|---|---|---|
| CN | 114728696 A | 7/2022 | |
| DE | 102006034814 B4 | 1/2010 | |
| EP | 2660147 B1 * | 9/2017 | ........... B64C 23/005 |

OTHER PUBLICATIONS

Extended European Search Report dated Oct. 17, 2024, 10 pages, issued in EP Application No. 24178724.1.

* cited by examiner

*Primary Examiner* — Timothy D Collins
*Assistant Examiner* — Justin Michael Heston
(74) *Attorney, Agent, or Firm* — Avek IP, LLC

(57) ABSTRACT

An airflow exhaust system for delivering exhaust produced from a fuel cell to optimize aircraft performance. Exhaust is distributed using a conduit network and released through outlets on the aircraft skin to provide boundary layer control for the aircraft. A control system distributes exhaust for boundary layer control, actuator control, and propulsion.

20 Claims, 5 Drawing Sheets

EXHAUST AIRFLOW SYSTEM

CROSS-REFERENCE TO RELATED APPLICATIONS

This application claims the benefit of U.S. Provisional Patent Application No. 63/506,358, filed Jun. 5, 2023, the entire contents thereof are herein incorporated by reference.

BACKGROUND OF THE INVENTION

1. Field

The disclosed embodiments relate generally to the field of optimizing aircraft performance using a fuel cell as a source of power. More specifically, the disclosed embodiments relate to the field of improving aircraft performance using boundary layer control.

2. Description of the Related Art

It is known to use fuel cells, which consume hydrogen for the production of power and energy, in a variety of power-generation capacities. Vaporous exhaust is a known biproduct of the reaction between hydrogen and oxygen which occurs during the process. In terms of applications, it is known to use hydrogen powered fuel cells to provide power for vehicles, as well as land based primary and backup sources of power.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the techniques described herein relate to an aircraft including: a fuel cell configured to consume hydrogen and produce an exhaust; and a conduit configured to direct at least some of the exhaust to one or more outlets disposed on an aircraft, the one or more outlets being configured to release the exhaust outside the aircraft, changing an aerodynamic property of the aircraft.

In some embodiments, the techniques described herein relate to an aircraft wherein the exhaust is pressurized and vaporous.

In some embodiments, the techniques described herein relate to an aircraft wherein the aerodynamic property is a boundary layer condition on a portion of an aircraft skin the one or more outlets are configured to release the exhaust at a location changing the boundary layer condition.

In some embodiments, the techniques described herein relate to an aircraft wherein the one or more outlets are configured to release the exhaust onto a control surface affecting the aerodynamic property of lift.

In some embodiments, the techniques described herein relate to an aircraft including a control system communicatively connected to the one or more outlets, the control system configured to change a degree of openness in one or more valves in response to a determined state of flight.

In some embodiments, the techniques described herein relate to an aircraft wherein upon the control system determining the state of flight creates a need for an increase in propulsion the control system changes the degree of openness of a first valve of the one or more valves to increase an amount of exhaust devoted to a first outlet located on an aircraft skin area increasing a propulsion characteristic of the aircraft.

In some embodiments, the techniques described herein relate to an aircraft wherein when the control system determines that the aircraft is at a cruise state of flight, the control system changes the degree of openness to distribute the exhaust to one or more first outlets to effect boundary layer control.

In some embodiments, the techniques described herein relate to an aircraft wherein when a detection is made by the control system that the aircraft requires movement of a control surface, the control system causes a particular valve of the one or more valves to increase an amount of exhaust transmitted to a control surface outlet enhancing an aerodynamic property of an aircraft control surface proximate the control surface outlet.

In some embodiments, the techniques described herein relate to an aircraft wherein the control system is configured to cause at least one valve of the one or more valves to release air directly to an exterior of the aircraft.

In some embodiments, the techniques described herein relate to an aircraft including: a first outlet in the one or more outlets, the first outlet being configured to release a first portion of the exhaust to affect a boundary layer condition on a portion of an aircraft skin; and a second outlet in the one or more outlets, the second outlet being configured to release a second portion of the exhaust onto a control surface to create lift.

In some embodiments, the techniques described herein relate to a system including: a fuel cell configured to consume hydrogen and produce an exhaust; a boundary layer control outlet configured on an aircraft skin; a conduit configured to deliver the exhaust to at least the boundary layer control outlet; and a controller configured to cause the system to distribute the exhaust through the conduit to the boundary layer control outlet to control an aircraft boundary layer property.

In some embodiments, the techniques described herein relate to a system wherein the boundary layer control outlet is configured into a skin of an aircraft.

In some embodiments, the techniques described herein relate to a system including: an actuator control outlet on the aircraft, the actuator control outlet configured to release the exhaust onto an aircraft control surface.

In some embodiments, the techniques described herein relate to a system wherein the actuator control outlet is disposed immediately forward of a lift enhancement device including at least an aileron, elevator, or rudder.

In some embodiments, the techniques described herein relate to a system including a propulsion outlet configured to direct the exhaust to increase propulsion of the aircraft.

In some embodiments, the techniques described herein relate to a system wherein the controller is configured to meter exhaust flow between at least two of a boundary layer control outlet, an actuator control outlet, and a propulsion outlet, to optimize efficiency of the aircraft.

In some embodiments, the techniques described herein relate to an aerodynamic process for use in an aircraft equipped with a fuel cell power system, the process including: receiving an exhaust from the fuel-cell power system; and releasing at least a portion of the exhaust outside of the aircraft at a location impacting an aerodynamic property of the aircraft.

In some embodiments, the techniques described herein relate to a process including: determining a state of flight based upon readings taken from flight reading instruments; and metering the exhaust released to the location based on the state of flight received.

In some embodiments, the techniques described herein relate to a process including: metering at least a portion of the exhaust between at least two of: (i) a first location impacting an aircraft boundary layer property (ii) a second location enhancing a lift characteristic provided by an aircraft elevator (iii) a third location configured to increase propulsion of the aircraft; and (iv) a fourth location configured to maintain aerodynamic neutrality.

In some embodiments, the techniques described herein relate to a process wherein the metering step includes: controlling an amount of the portion of the exhaust released at each of the first, second, third, and fourth locations.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1:
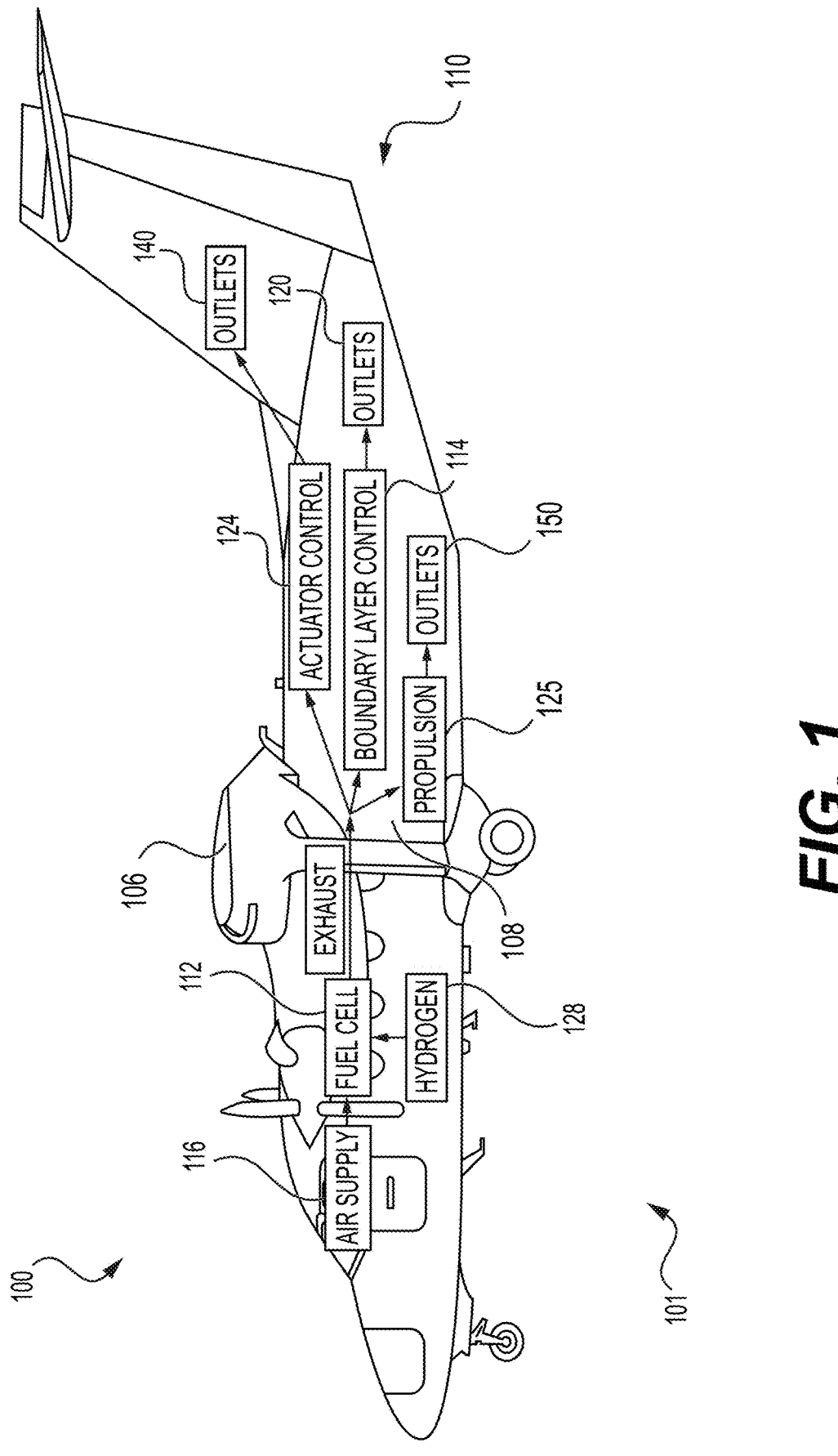
FIG. 1 is a flow schematic of an airflow exhaust system which shows an aircraft viewed through a transparent lens, revealing components within the aircraft body while detailing a flow of substance throughout the system.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Overview

Embodiments provide systems and methods for using fuel cell exhaust as a means to supply an external airflow exhaust system configured to positively impact aircraft performance. This system includes methods to reduce drag, increase thrust, and reduce trim on an aircraft. The exhaust product is produced by the reaction of hydrogen and oxygen in the fuel cell. In embodiments, exhaust can be distributed throughout the aircraft for boundary layer control, fluidic flow control actuation, and/or for propulsion enhancement.

Hydrogen fuel cells are advantageous when used to provide an aircraft with power because hydrogen fuel cells produce zero emissions unlike jet fuels and have higher energy density than lithium batteries. Hydrogen fuel cells generate electricity via electrochemical reactions and can be used, in embodiments, to contribute power for use in an electrically driven propulsion systems, or to comprise an aircraft Auxiliary Power Unit (APU).

The power generating reactions occur within the fuel cell. In a fuel cell hydrogen and oxygen are combined to produce electrical energy while heat and water are biproducts of the reaction. Within the cell exists an anode, cathode, and a proton exchange membrane. Hydrogen is supplied to the anode of the system and a catalyst splits apart the hydrogen molecules into protons and electrons. Protons then pass through the proton exchange membrane while the separated electrons pass through a circuit generating both electricity and heat. At the cathode terminal, oxygen, protons, and electrons are combined to produce water molecules as a biproduct of the reaction. This water biproduct may be pressurized and can be expelled as an exhaust vapor whose mass flow can be fashioned in a way to be used for boundary layer control, enhancing fluidic actuators, and/or thrust enhancement.

Hydrogen when used as a fuel provides less energy by volume than other fuels. Because of this, it must be stored in liquid form aboard the aircraft. To be stored in liquid form, the hydrogen may either be compressed to high pressures (possibly approximately 700 bar) or be liquified to cryogenic conditions, where the pressures need not be as high. Storing hydrogen in cryogenic conditions at low pressure is advantageous for storage onboard an aircraft because high pressure storage conditions require components which increase the weight of an aircraft. When stored in liquid form, hydrogen has an energy density of approximately four liters of hydrogen to one liter of standard jet fuel. These characteristics and storage conditions mean that hydrogen tanks may be larger than standard jet fuel tanks. The resulting increase in size and weight will cause the aircraft to consume more fuel, and methods are needed to decrease drag and improve aircraft performance. The following disclosed embodiments provide ways in which aircraft performance can be improved using products produced from the fuel cell reaction.

On an aircraft in flight, slower moving air flows near and around the aircraft surfaces (skin) which increases effects of drag experienced by the aircraft. This can be referred to as skin friction. Boundary layer control is a method which reduces the drag on an aircraft by accelerating the slower moving air flowing near the aircraft skin. Reducing drag is beneficial because it allows for the fuel burn of an aircraft to decrease and allows the aircraft to operate at a higher efficiency and improves performance.

Drag reduction can be accomplished on an aircraft using numerous different methods. One method to reduce drag on an aircraft is boundary layer control. Boundary layer control often involves using boundary layer injection, which is a process in which slower moving air that exists in flight near the airframe is sped up by injecting air along the airframe or ingesting air and accelerating it along an airframe. Boundary layer control energizes turbulent flow to prevent separation of air layers and forces this separation of air layers to occur later. In embodiments, boundary layer control can be accomplished by distributing the exhaust/vapor produced from the electrochemical reaction in the fuel cell to numerous places about the aircraft to increase the flow of air across aircraft skin. Introducing additional airflow across the skin while in flight can reduce the drag experienced by the aircraft.

Fuel cell exhaust is advantageous for controlling an aircraft boundary layer because exhaust from the fuel cell has a lower density by volume (vaporous) than does the air in the atmosphere around the aircraft. This relatively low-density air or possibly vaporous exhaust produced by a fuel cell improves boundary layer control processes used to improve skin friction drag and/or prolong the onset of turbulent airflow on the airframe. In summary, low-density air on the skin surfaces is advantageous when used during boundary layer control methods to reduce skin friction drag.

Air and/or vaporous exhaust produced by the fuel cell can be directed to enhance the operation of control surfaces powered by actuators to positively impact aircraft performance. In embodiments, a process is disclosed that uses and directs mass flow of pressurized exhaust to enhance the operation of control surfaces (thus operating as a fluidic actuator in place of control surface angling). This process is beneficial to aircraft performance because elevators and control surfaces can achieve higher levels of lift while using lower angles of deflection. This allows for a later separation of air flow energized by the actuator, and thus, the size of the control surfaces may be decreased, which reduces skin drag and weight.

Another possible method to increase aircraft performance, disclosed in embodiments, is a system which expels exhaust produced from the fuel cell and releases exhaust from the aircraft in a way capable of increasing thrust and propulsion. The exhaust produced from the fuel cell can be expelled out of the aircraft with force in the direction of travel to increase the airspeed of the aircraft and to contribute to boundary layer control of the aircraft skin.

"Exhaust" as used in this application should not be interpreted in some narrow fashion. As used within this application "exhaust" is anything that is a product of the reaction within the fuel cell and may or may not be vaporous. In embodiments, exhaust may be a pressurized vapor containing water biproduct produced from the fuel cell reaction.

Embodiments with Reference to Figures

With reference to FIG. 1, an airflow exhaust system 100 is shown and described. The airflow exhaust system 100 delivers air and/or vaporous exhaust produced by the fuel cell 112 using a conduit network where exhaust is released to change aerodynamic properties of the aircraft. In embodiments, exhaust is released to provide boundary layer control 114 for the aircraft. Boundary layer control 114 includes one or more outlets 120 disposed on the aircraft skin and configured to release exhaust to provide boundary layer control 114 for the aircraft skin. FIG. 1 is a flow schematic shown within an aircraft body 101 including a fuel cell 112 internal the aircraft body 101. Fuel cell 112 is depicted in FIG. 1 to intake both outside air 116 and gaseous hydrogen 128 for reaction. In embodiments hydrogen 128 may be supplied from a conduit connected to a hydrogen fuel tank. In some embodiments, hydrogen 128 may be stored in a gaseous hydrogen tank and in other embodiments hydrogen may be stored in a liquid hydrogen tank. The exhaust is distributed from the fuel cell 112 to any of the boundary layer control 114, actuator control 124, and propulsion 125, all of which affect an aircraft's aerodynamic properties. The exhaust may be supplied from the fuel cell 112 using a conduit or a series of conduits (see FIG. 3). Boundary layer control 114 includes outlets 120, actuator control 124 includes one or more outlets 140, and propulsion 125 includes one or more outlets 150.

Use of the term "outlets" as used within this application is not to be limited to any particular configuration, but is instead intended to describe any arrangement from which exhaust can be released or expelled from the aircraft. For example, a nozzle, nozzles, a slot opening, or slot openings are all possible configurations which may be used to expel exhaust from the aircraft. Outlets 120, 140, and 150 are shown illustratively to demonstrate systems and methods, but could have any variety of shapes depending on intended function.

Figure 2A:
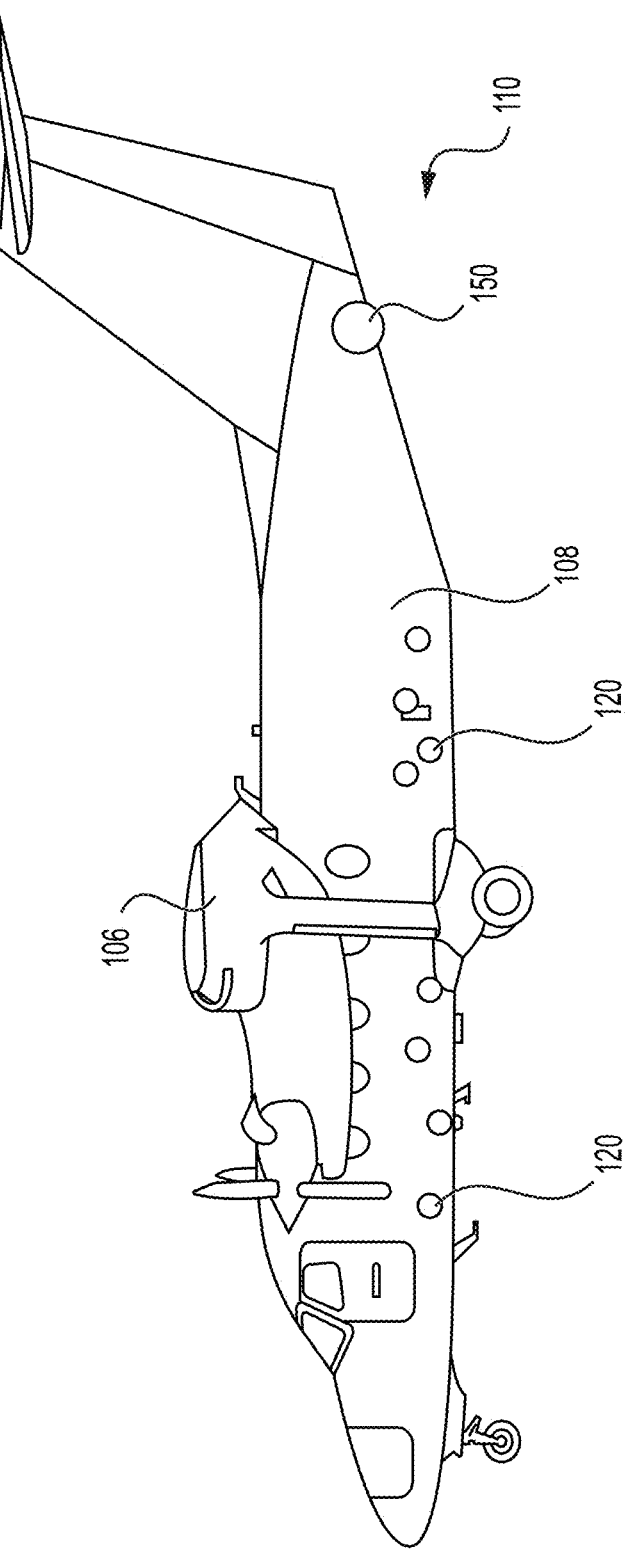
FIG. 2A is a side view of the aircraft of FIG. 1.
Figure 2B:
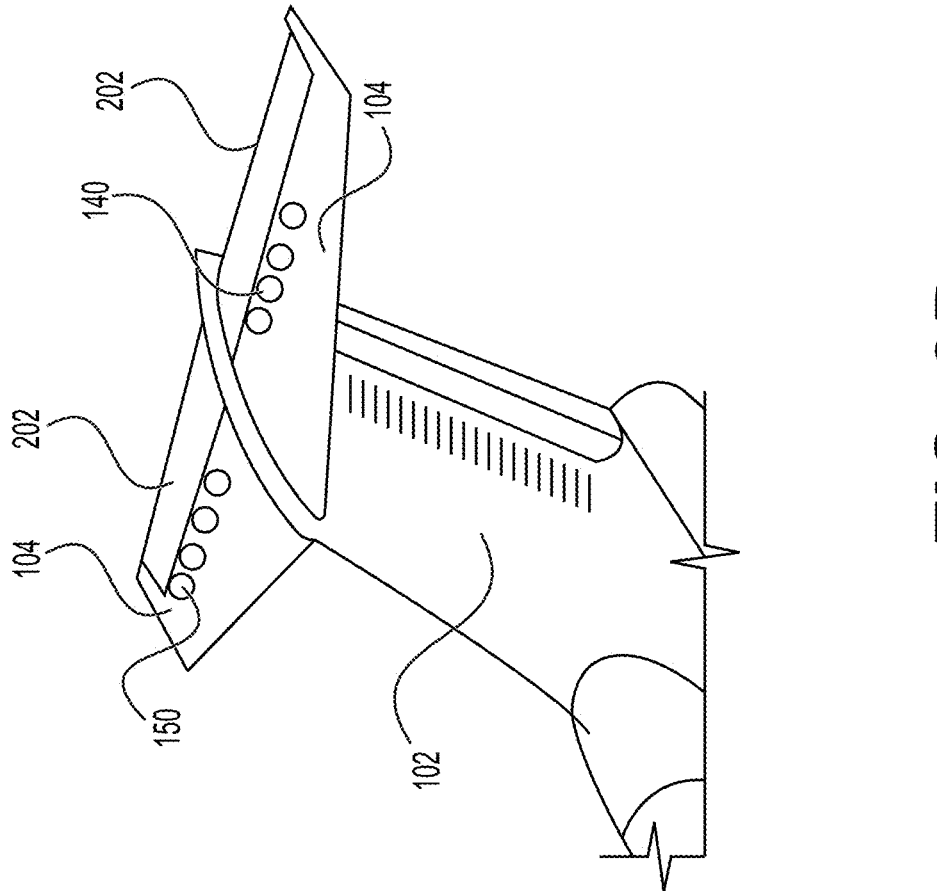
FIG. 2B is an enhanced view of a tail of the aircraft of FIG. 1 allowing for additional, pertinent components to be shown.

FIGS. 2A and 2B show boundary layer control 114, actuator control 124, and propulsion 125 in embodiments using outlets 120, 140, and 150 respectively. With reference to FIG. 2A, one or more outlets 120 are disposed on the fuselage skin 108 of the aircraft. Outlets 120 may vary in count and location, and in some embodiments may be disposed at other locations on the aircraft fuselage or on any other exterior aircraft components. The outlets 120 are configured to release exhaust to accomplish boundary layer control 114. The airflow exhaust system 100 substantially accomplishes boundary layer control 114 by accelerating and releasing exhaust through outlets 120. The exhaust released through outlets 120 may be pressurized, which is advantageous for boundary layer control 114. In embodiments, it is advantageous to dispose and position the outlets 120 on the fuselage 108 due to its large surface area/aircraft skin which creates high amounts of friction and drag. Releasing exhaust at an accelerated rate along the airframe substantially reduces the drag experienced by the aircraft. In embodiments boundary layer control 114 may be accomplished by disposing outlets 120 at identified locations on the exterior of the aircraft where accelerating air flowing near the aircraft skin would have the greatest effect in reducing skin friction drag. These locations include fuselage 108 and wings 106 (specifically air-fuselage junctions, leading edges and/or endings) which are most prone to skin friction over the course of flight. This makes these locations optimal for positioning outlets 120 to most impact the aircraft skin boundary layer. The boundary layer control component 114 outlets 120, as discussed above, can include numerous variations of size, shape, count, orientation, and location depending on the aircraft structure and airflow characteristics. Those skilled in the art will recognize these outlets can be sized and shaped to best utilize the pressure of the exhaust and positioned strategically to have the most impact on boundary layer control to reduce skin friction. By designing the aircraft in a way that the surfaces impacted the most by skin friction are known, the aircraft designer can position and direct the boundary layer control 114 outlets 120 effectively to reduce skin friction and drag. Accelerating air near aircraft skin surfaces, as discussed above, changes an aerodynamic property of an aircraft by greatly decreasing skin friction and drag.

FIG. 2A shows an outlet 150 disposed on the aircraft empennage 110. The outlet 150 is configured to expel exhaust in a direction aligned with the aircraft flight of travel to increase the propulsion 125 of the aircraft. In some embodiments, more than one outlet 150 may be disposed on the empennage 110, the trailing edges of wings 106, or other external surface of the aircraft. When exhaust is ejected through outlets 150, force created from the ejection of the exhaust will propel the aircraft forward increasing the airspeed.

FIG. 2B shows outlets 140 disposed on a horizontal stabilizer 104 of the aircraft configured near tail 102. Outlets 140 are positioned and directed to provide actuator control 124 for the airflow exhaust system 100. Actuator control 124, in embodiments, enhances aircraft performance by allowing elevator(s) 202 the ability to achieve greater lift characteristics upon smaller angles of deflection, which also can decrease elevator 202 size. In embodiments, the outlets 140 are disposed immediately forward of the elevators 202 and are directed upwards perpendicular to horizontal stabilizer 104. The outlets 140 are positioned to expel air/exhaust to enhance the aerodynamic property of lift generated by the deflection of control surfaces, which in embodiments are elevators 202. When supplied with exhaust, outlets 140 direct accelerated exhaust upwards when elevators 202 are deflected downwards which increases the effectiveness of the elevators 202 in creating lift. The relatively high-velocity air streams from outlets 140 substantially enhances the effect of the elevators 202 creating greater lift upon a downward angular deflection. Outlets 140 are positioned such that the relatively higher velocity exhaust is released atop the horizontal stabilizer 104 immediately in advance of elevators 202. The relatively higher velocity of the exhaust over the elevator thus increases the lift characteristics of the control surface when the elevator is deflected downwards, thus enabling a smaller elevator size to be designed into the aircraft for the purposes of establishing needed downward pitch. Alternatively, a similar outlet arrangement might be configured onto the underside of the horizontal stabilizer in advance of the underside of the elevators. This would enhance the lift influence of the elevators in establishing upward pitch of the elevator and aircraft descent. Still alternatively, upwardly and/or downwardly directed nozzles could be installed on the upper or undersides of the horizontal stabilizer 104 to enhance pitch characteristics in addition to the elevators 202. Regardless, the elevators 202 and other control surfaces may be sized smaller while still achieving equal pitch influence (and designed for lower deflection angles) than they would on an aircraft without the high-velocity air using actuator control 124. In some embodiments, the outlets 140 may be disposed directly on the elevators 202. Those skilled in the art will recognize that the same use of high-velocity exhaust (e.g., here as a fluid actuator) could also be implemented onto other control surfaces of the aircraft, such as rudders and ailerons, as well as to lift enhancement devices such as flaps, to achieve similar objectives. Outlets 140 may vary in count, size, and location on the horizontal stabilizer 104 and other aircraft control surfaces. Exact configurations of outlets 140 and locations will depend on the aircraft structure and airflow characteristics.

Figure 3:
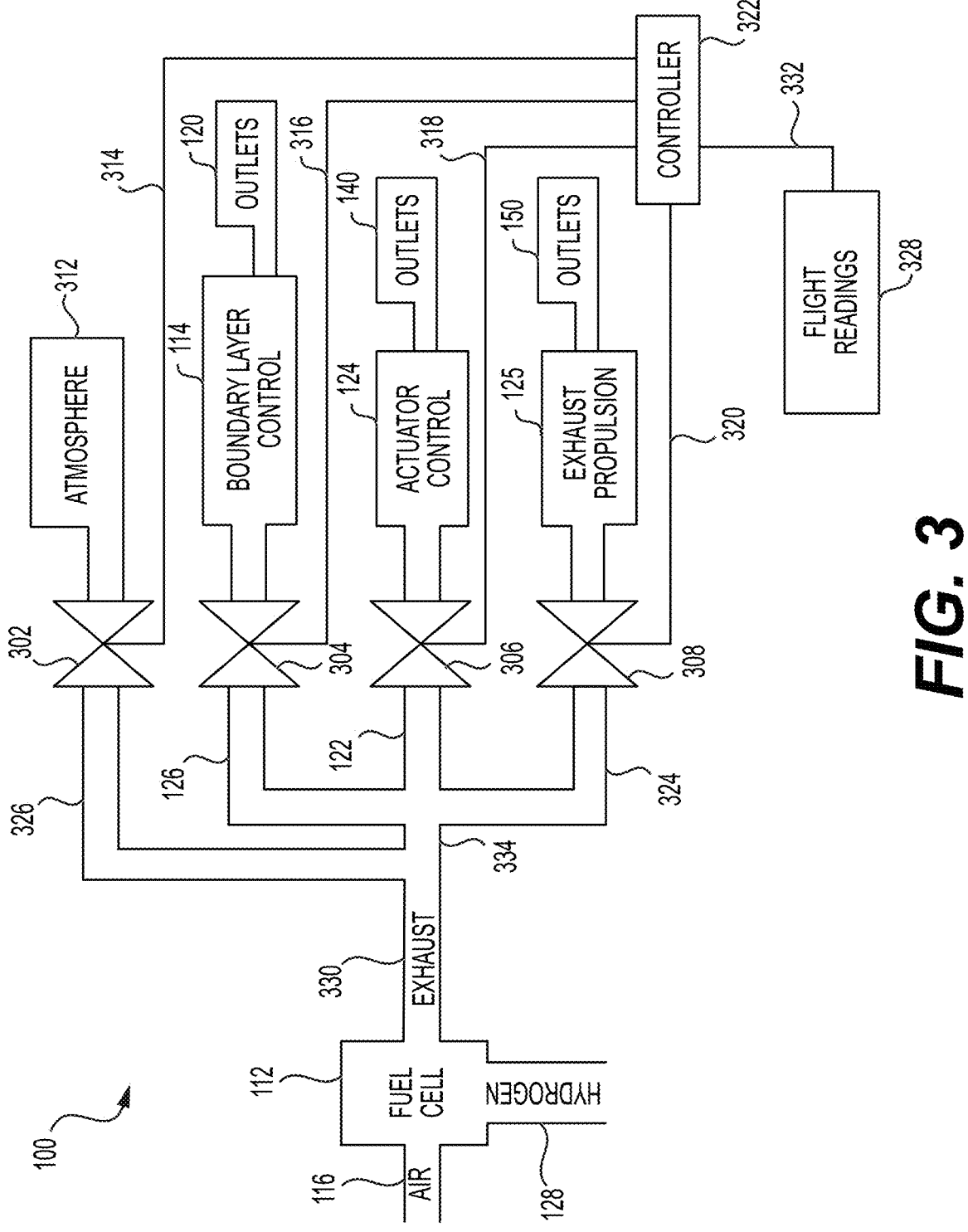
FIG. 3 is a schematic of the airflow exhaust system of FIG. 1 detailing connectivity for a controller to control delivery of exhaust throughout the system in an embodiment.

FIG. 3 shows a connective exhaust distribution network of the airflow exhaust system 100. Referring to the figure, hydrogen 128 and outside air 116 are supplied to the fuel cell 112 for reaction. Conduit 330 connects to fuel cell 112 and transfers exhaust generated from the fuel cell 112 to a junction 334 providing connection for exhaust distribution to the different possible exhaust expulsion systems. More specifically in embodiments, junction 334 allows for delivery of exhaust/air to any of the outside environment 312, boundary layer control 114, actuator control 124, and propulsion 125. The exhaust supply to each system will depend on status (open/closed) of respective valves leading to each system. In embodiments a controller 322 is operatively and communicatively connected to valve systems 302, 304, 306, and 308 to distribute or meter exhaust to any of the systems. Any exhaust passing through conduit 326 will encounter valve 302 leading directly to the atmosphere 312 external of the aircraft. Any exhaust passing through conduit 126 will encounter valve 304 leading to boundary layer control 114 outlets 120. Any exhaust passing through conduit 122 will encounter a valve 306 leading to actuator control 124 outlets 140. Any exhaust passing through conduit 324 will encounter a valve 308 leading to exhaust propulsion 125 outlets 150. Each valve status is controlled by the controller 322 (e.g., computing system with processing capabilities) which includes a processing component and other systems capable of establishing a level of openness to each valve enabling and/or disabling the deliverance of exhaust to each of the outlets of the respective systems designed to optimize aircraft performance.

Each of valve groups 302, 304, 306, and 308 are configured to receive commands from and be operated by the controller 322 via electrical (or wireless) connections 314, 316, 318, and 320, respectively. In operation, as the fuel cell 112 consumes hydrogen and generates exhaust flowing through conduit 330, the controller 322 can supply exhaust for boundary layer control 114 by opening valve 304. If this occurs, exhaust will be able to be released from outlets 120 via conduit 126.

Alternatively, the controller 322 could also supply exhaust to enhance the operation of a control surface using the actuator control 124 outlets 140 which may be supplied with exhaust via conduit 122 with valve 306 being open. Actuator control 124, in embodiments, includes outlets 140 disposed on the upper side of elevators 202 as discussed above. The controller 322 can meter the amount of exhaust supplied such that the angles of the elevators 202 may be adjusted based upon the desired need of the aircraft in flight.

The controller 322 may supply exhaust for exhaust propulsion 125 via conduit 324 with valve 308 being open. In embodiments, exhaust propulsion 125 uses outlets 150 designed, directed, and located to contribute the pressurized flow of exhaust in a direction aligned with aircraft flight direction to increase the airspeed of the aircraft.

The controller 322 could also receive commands from the flight instruments 328 to execute commands for exhaust to immediately exit the aircraft. This can be accomplished via conduit 326 with valve 302 being open allowing the exhaust to escape into the outside atmosphere 312. When exhaust is released to the atmosphere 312 via conduit 326, the release of exhaust is substantially aerodynamically neutral and does not provide substantial affect to any aerodynamic properties.

Controller 322 in the control system is shown to control the airflow exhaust system 100 described above, to accomplish dynamic control in substantially optimizing aircraft performance. As the airflow exhaust system 100 receives exhaust via conduit 330 from fuel cell 112, it distributes exhaust (in any variety of ways) to substantially control aircraft optimization systems. Controller 322 will allow, disallow, or meter flow to the atmosphere 312, boundary layer control 114 outlets 120, actuator control 124 outlets 140, and exhaust propulsion 125 outlets 150 controlling the openness or closedness of valves 302, 304, 306, and 308. The degree of openness or closedness of each valve will determine an amount or flowrate of exhaust, if any, that will be distributed to each system and outlet network.

Methods to best optimize the aircraft performance in flight will be recognized by controller 322 so exhaust may be distributed appropriately by controller 322 to the said systems. The controller 322 is configured to be relayed aircraft diagnostic information via connection 332 from flight detection instruments 328 on the aircraft such that the controller is able to determine an aircraft state of flight. For instance, the flight detection instruments 328 can contain already known devices that are capable of measuring aircraft airspeed, pitch, and other diagnostics giving information on the status and efficiencies/inefficiencies of aircraft systems.

One factor which may be accounted for by the controller 322 could be instructions from a pilot or autopilot to increase the propulsion level of the aircraft, e.g., when an aircraft state of flight requires increased propulsion, such as for takeoff. Given the priority for propulsion during a climbing state of flight, fuel cell 112 exhaust may be distributed for propulsion 125 and outlets 150 to increase aircraft propulsion. Alternately, when aircraft lift is needed, exhaust may be distributed to actuator control 124 outlets 140 to provide enhanced elevator 202 control. In some instances, controller 322 may meter exhaust flow between both the propulsion 125 and actuator control 124. In yet other instances, the controller 322 may recognize that the aircraft is neither climbing or descending, which may indicate the aircraft is at cruising altitude in a cruise state of flight, in which case the exhaust could be supplied to the boundary layer control 114 outlets 120 to reduce skin friction drag and optimize efficiency and aircraft performance.

Airspeed is another factor may be relayed to the controller 322 which could influence where exhaust is supplied to. For example, if the aircraft is encountering head wind, lowering the airspeed, it may be necessary to optimize the aircraft by supplying exhaust for exhaust propulsion 125. If the aircraft is encountering tailwind, increasing the airspeed, it may be most optimal for the exhaust to be supplied for boundary layer control 114 optimizing efficiency.

The controller 322 may also determine that it is most optimal to supply exhaust to each of the systems by partially opening or closing valves 302, 304, 306, and 308 through a metering process where valves are opened and closed to varying degrees as a part of optimizing flight by devoting exhaust air to different systems simultaneously.

Figure 4:
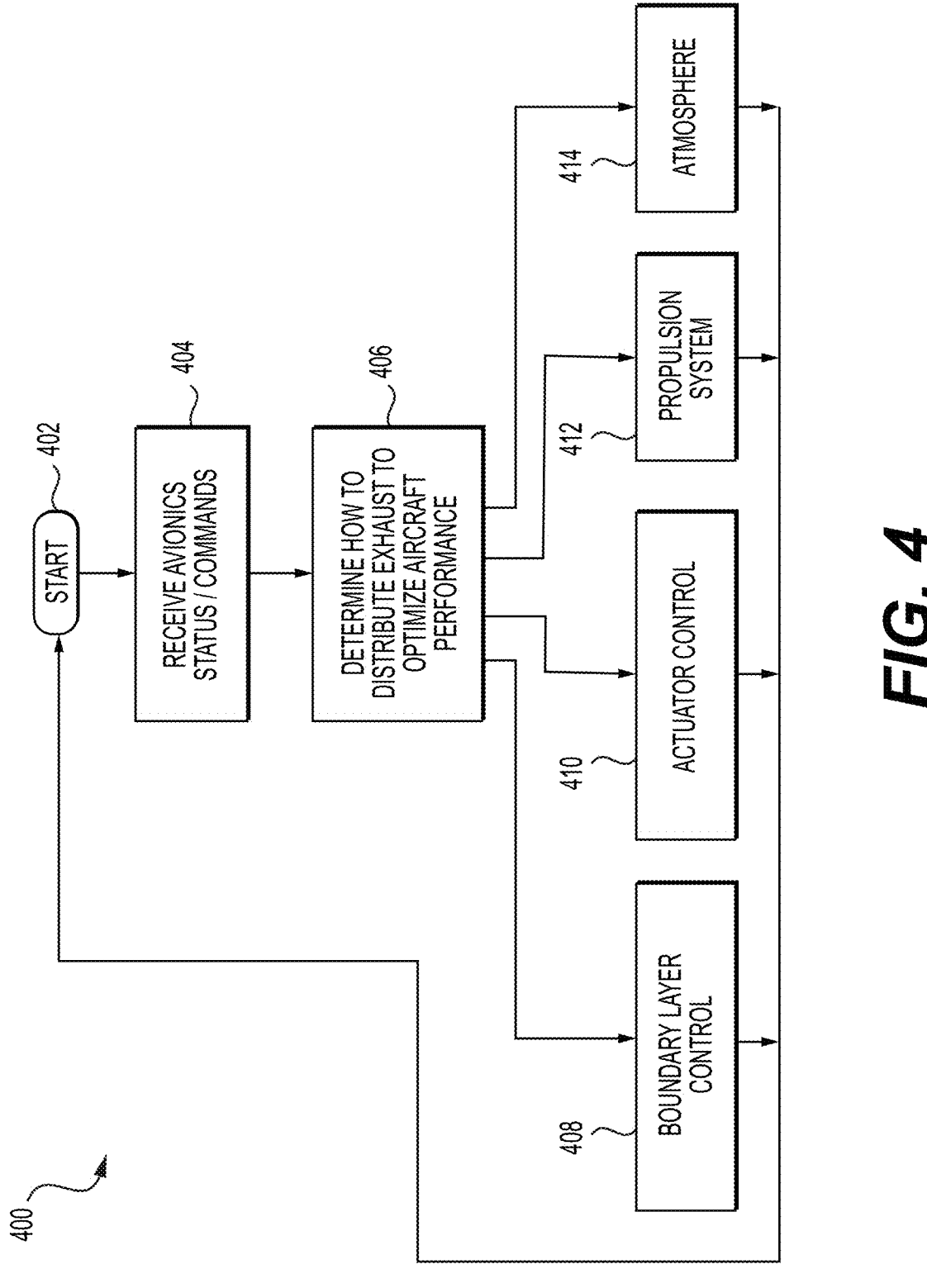
FIG. 4 is a process flow diagram detailing steps executed by the controller of FIG. 3 controlling the delivery of exhaust throughout the system of FIG. 1 in an embodiment.

FIG. 4 depicts a high-level method flow detailing a method 400 executed by the controller 322 to optimize efficiency of the aircraft.

In a step 402 the method 400 begins.

In a step 404, aircraft avionics and status are relayed to the controller. In embodiments, controller 322 receives flight reading detections 328 from detection instruments via connection 332. Flight readings may include an aircraft speed, pitch, and which may allow controller 322 to determine an aircraft phase of flight.

In a step 406, the controller 322 determines how to distribute exhaust to optimize the aircraft efficiency. In embodiments, controller 322 executes commands controlling valves to distribute exhaust to systems and outlets to best optimize aircraft performance based upon the information received in step 404. Using information, such as airspeed or pitch, the controller 322 controls valves metering exhaust flow into all, some, or none of the systems to best optimize the aircraft state of flight at that point in time. In embodiments, the controller 322 can use aircraft diagnostics in numerous different ways to manipulate exhaust flow rates via connections 314, 316, 318, and 320 communicating with valves 302, 304, 306, and 308 to optimize the aircraft and improve its performance.

In embodiments, the controller 322 could process instructions received from either readings from known instruments, instructions, or information received from a fly-by-wire avionics system to operate control valves 302, 304, 306, and 308 to optimize aircraft performance.

The aircraft pitch is one reading that could be relayed to the controller 322. If the flight conditions indicate an increase in pitch of the aircraft is needed, the controller 322 could open valve 306 to supply exhaust to the outlets 140 affecting actuator control 124, with the exhaust enhancing any deflection made by the elevator(s) 202, to control the aircraft ascent. Alternatively, if the instruments indicate a need for a downward pitch, e.g., when the aircraft is landing, the controller 322 could close valve 306 and open valve 302 to release the exhaust to the atmosphere 312 (the release being substantially aerodynamically neutral) since the aircraft could likely be landing and does not need increased efficiency or speed. The aircraft could also be assuming a neutral trajectory at a cruise state of flight in which the controller 322 could supply the boundary layer control 114 and/or propulsion 125 systems with exhaust to increase efficiency and/or airspeed.

The controller 322 could also be relayed aircraft airspeed from known instruments and/or avionics to control valves 302, 304, 306, and 308 to optimize aircraft performance. If the airspeed of the aircraft needs to be increased the controller 322 could open valve 308 to supply the propulsion system 125 and increase airspeed when exhaust is projected out of outlets 150. Alternatively, if the airspeed is too fast the controller 322 could open valve 302 to release the exhaust to the atmosphere 312 since no system needs supplied with exhaust. The aircraft could also be running at optimal airspeed in which case the controller 322 could open valve 304 to supply the outlets 120 affecting boundary layer control 114 to increase the aircraft's efficiency.

In steps 408, 410, 412, and 414 (which could be executed in series or in parallel) appropriate valves are opened supplying exhaust to each system.

In step 408, the controller 322 distributes exhaust to boundary layer control 114. In embodiments, controller 322 can open valve 304 via connection 316 to supply exhaust for boundary layer control 114 which includes outlets 120.

In step 410, the controller 322 distributes exhaust for actuator control 124. In embodiments, controller 322 can open valve 306 via connection 318 to supply exhaust for actuator control 124 which includes outlets 140.

In step 412, the controller 322 distributes exhaust for propulsion 125, In embodiments, controller 322 can open valve 308 via connection 320 to supply exhaust for propulsion 125.

In step 414, the controller 322 can release exhaust directly to the external of the aircraft. In embodiments, controller 322 can open valve 302 via connection 314 to allow exhaust to exit to the atmosphere 312. The process then proceeds back to the beginning.

In some embodiments, the airflow exhaust system 100 enables simultaneous exhaust flow metering between the systems described. For example, controller 322 would be configured to simultaneously operate all of valves 302, 304, 306, and 308 to varying degrees of openness to optimize aircraft performance. The process could use aircraft status information and commands (see step 404) and then meter flow for boundary layer control 114, propulsion 125, and actuator control 124 systems dynamically according to flight objectives determined.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. An aircraft comprising:
a fuel cell configured to consume hydrogen and produce an exhaust;
one or more actuator control outlets disposed on the aircraft;
one or more boundary layer control outlets disposed on the aircraft;
a conduit configured to direct at least some of the exhaust from the fuel cell directly to the one or more actuator control outlets and the one or more boundary layer control outlets, wherein the one or more actuator control outlets are disposed immediately forward of a control surface and configured to direct the exhaust upwards relative to the control surface for increasing lift generated by the control surface, and the boundary layer control outlets are configured to release the exhaust to optimize an aircraft boundary layer and reduce skin friction drag; and
a control system configured to distribute a first portion of the exhaust to the boundary layer control outlets and a second portion of the exhaust to the actuator control outlets, wherein distribution of the first portion of exhaust causes a reduction of skin friction drag and distribution of the second portion of exhaust causes an increase in aircraft lift.

2. The aircraft of claim 1, wherein the control system is configured to determine a flight condition, wherein the control system is communicatively connected to the actuator control outlets and the boundary layer control outlets, and configured to change a degree of openness in a plurality of valves and distribute exhaust to the actuator control outlets to increase aircraft lift and the boundary layer control outlets to reduce skin friction drag based on the flight condition.

3. The aircraft of claim 2, wherein when the control system determines the flight condition creates a need for an increase in propulsion, and the control system changes the degree of openness of a first valve of the plurality of valves to increase an amount of exhaust devoted to a propulsion outlet disposed on an aircraft skin area configured to expel the exhaust and increase a propulsion characteristic of the aircraft.

4. The aircraft of claim 2, wherein when the control system determines that the aircraft is at a cruise state of flight, the control system changes the degree of openness of a second valve of the plurality of valves to distribute the exhaust to the boundary layer control outlets to reduce skin friction drag of the aircraft.

5. The aircraft of claim 2, wherein when a detection is made by the control system that the aircraft requires deflection of the control surface, the control system causes a third valve of the plurality of valves to increase an amount of exhaust transmitted to the actuator control outlets increasing lift produced by the control surface immediately behind the actuator control outlets.

6. The aircraft of claim 2, wherein the control system is configured to cause a fourth valve of the plurality of valves to release air directly to an atmosphere control outlet disposed on an aircraft skin and configured to release the exhaust to an exterior of the aircraft wherein the atmosphere control outlet does not affect an aerodynamic property of the aircraft.

7. The aircraft of claim 1, wherein the boundary layer control outlets are disposed on a portion of an aircraft fuselage, wherein the one or more boundary layer control outlets are configured to release the exhaust to energize turbulent flow and prevent separation of air layers.

8. The aircraft of claim 1, wherein the actuator control outlet is disposed immediately forward of an elevator.

9. The aircraft of claim 1, comprising a control surface having an angle of deflection which corresponds to a degree of aircraft lift and release of the exhaust changes the degree of aircraft lift, which corresponds to the angle of deflection of the control surface.

10. A system comprising:
a fuel cell configured to consume hydrogen and produce an exhaust;
a boundary layer control outlet disposed on an aircraft skin and an actuator control outlet disposed on a wing;
a conduit configured to deliver the exhaust to at least the boundary layer control outlet and the actuator control outlet;
the actuator control outlet being disposed immediately in front of a an elevator having an angle of deflection which corresponds to a degree of aircraft lift, and wherein release of exhaust from the actuator control outlet increases the degree of aircraft lift, which corresponds to the angle of deflection of the elevator; and
a controller configured to determine a flight condition and distribute the exhaust based on the flight condition, wherein the exhaust is distributed through the conduit to the boundary layer control outlet and the actuator control outlet to optimize an aircraft boundary layer and reduce skin friction drag.

11. The system of claim 10, comprising a propulsion outlet configured to direct the exhaust to increase propulsion of the aircraft.

12. The system of claim 11, wherein the controller is configured to meter exhaust flow between at least two of the boundary layer control outlet, the actuator control outlet, and the propulsion outlet, to optimize efficiency of the aircraft.

13. The system of claim 10, wherein the boundary layer control outlet is disposed onto a fuselage of an aircraft.

14. The system of claim 10, wherein the actuator control outlet is disposed immediately forward of an aileron.

15. The system of claim 10, wherein the conduit delivers the exhaust from the fuel cell directly to at least the boundary layer control outlet or the actuator control outlet.

16. The system of claim 10, wherein the exhaust does not pass through a heat exchanger prior to being released from the actuator control outlet.

17. The system of claim 10, wherein the actuator control outlet is disposed immediately forward of a rudder.

18. An aerodynamic process for use in an aircraft equipped with a fuel-cell power system, the process comprising:

receiving an exhaust from the fuel-cell power system;

determining a flight condition based on aircraft diagnostic information;

releasing a first portion of the exhaust from the fuel-cell power system from an actuator outlet disposed on an aircraft wing immediately in front of an elevator when the flight condition indicates a deflection of the elevator, wherein the release of the first portion of exhaust increases a lift characteristic of the elevator;

releasing a second portion of the exhaust from the fuel-cell power system from a boundary layer control outlet disposed on an aircraft fuselage when the flight condition indicates the aircraft is in a cruise state of flight, wherein the release of the second portion of exhaust reduces skin friction drag of the aircraft; and releasing a third portion of the exhaust from the fuel-cell power system from a propulsion outlet disposed on an aircraft body when the flight condition indicates an increase in thrust, wherein the release of the third portion of the exhaust increases propulsive power of the aircraft.

19. The process of claim 18, wherein release of the first portion of exhaust increases a degree of aircraft lift which corresponds to an angle of deflection of the elevator.

20. The process of claim 18, comprising determining an amount of the first portion of exhaust, the second portion of exhaust, and the third portion of exhaust, and metering the first, second, and third portions to the actuator outlet, the boundary layer outlet, and the propulsion outlet, respectively.

\* \* \* \* \*